United States Patent
Tomlinson

(10) Patent No.: US 9,142,967 B2
(45) Date of Patent: Sep. 22, 2015

(54) SYSTEM FOR TRACKING AND ALLOCATING RENEWABLE ENERGY CONTRIBUTIONS TO A MODULAR RENEWABLE ENERGY SYSTEM

(75) Inventor: Joseph Tomlinson, Park City, UT (US)

(73) Assignee: PV Solutions, LLC, Portsmouth, RI (US)

( * ) Notice: Subject to any disclaimer, the term of this patent is extended or adjusted under 35 U.S.C. 154(b) by 580 days.

(21) Appl. No.: 13/602,392

(22) Filed: Sep. 4, 2012

(65) Prior Publication Data

US 2013/0060396 A1 Mar. 7, 2013

Related U.S. Application Data

(60) Provisional application No. 61/530,565, filed on Sep. 2, 2011.

(51) Int. Cl.
| | | |
|---|---|---|
| G06Q 50/06 | (2012.01) | |
| H02J 3/06 | (2006.01) | |
| H02J 3/38 | (2006.01) | |
| H02J 7/35 | (2006.01) | |
| H02J 13/00 | (2006.01) | |

(52) U.S. Cl.
CPC ............... *H02J 3/383* (2013.01); *G06Q 50/06* (2013.01); *H02J 7/35* (2013.01); *H02J 3/06* (2013.01); *H02J 3/386* (2013.01); *H02J 13/0075* (2013.01); *Y02B 80/34* (2013.01); *Y02B 90/2653* (2013.01); *Y02E 10/563* (2013.01); *Y02E 10/566* (2013.01); *Y02E 10/763* (2013.01); *Y02E 40/72* (2013.01); *Y04S 10/123* (2013.01); *Y04S 40/126* (2013.01)

(58) Field of Classification Search
CPC ............ G06Q 50/06; H02J 3/06; H02J 3/383; Y02B 80/34; Y04S 10/123
USPC .............. 700/286, 295, 297; 702/62; 705/412
See application file for complete search history.

(56) References Cited

U.S. PATENT DOCUMENTS

| | | | | |
|---|---|---|---|---|
| 6,088,688 | A | * | 7/2000 | Crooks et al. ................. 705/412 |
| 6,380,481 | B1 | | 4/2002 | Muller |
| 7,741,727 | B2 | | 6/2010 | Fein et al. |
| 7,925,552 | B2 | | 4/2011 | Tarbell et al. |
| 7,979,166 | B2 | | 7/2011 | Yamada et al. |
| 8,220,569 | B2 | | 7/2012 | Hassan |
| 8,644,995 | B2 | * | 2/2014 | Hinman et al. ............... 700/286 |

(Continued)

FOREIGN PATENT DOCUMENTS

| | | |
|---|---|---|
| CN | 201070989 Y | 6/2008 |
| CN | 101619711 A | 1/2010 |

OTHER PUBLICATIONS

4th Annual Milford Renewable Energy Fair, Hosted by SUTREC, "Commercialization & Regional Development"[Online] 2012. http://crd.usu.edu/htm/in-the-news/articleID=17021 (accessed Aug. 9, 2012).

(Continued)

*Primary Examiner* — Robert Fennema
*Assistant Examiner* — Jennifer L Norton
(74) *Attorney, Agent, or Firm* — Sheridan Ross P.C.

(57) ABSTRACT

A modular photovolataic (PV) array system includes a PV array installed onto a fleet vehicle such as a trailer, bus etc., a host control system into which a plurality of fleet vehicles can connect to collectively generate electricity, and a subscriber system which collectively tracks energy generation and allocates respective contributions to the system.

18 Claims, 5 Drawing Sheets

(56) References Cited

U.S. PATENT DOCUMENTS

| | | |
|---|---|---|
| 2006/0119106 A9 * | 6/2006 | Borden et al. .................. 290/44 |
| 2008/0234871 A1 * | 9/2008 | Yamada et al. ............... 700/286 |
| 2009/0234757 A1 * | 9/2009 | Tarbell et al. ................... 705/30 |
| 2010/0193260 A1 | 8/2010 | Freeman |
| 2010/0207452 A1 | 8/2010 | Saab |
| 2010/0224227 A1 | 9/2010 | Lindsey |
| 2010/0228415 A1 | 9/2010 | Paul |
| 2010/0314935 A1 | 12/2010 | Reichart et al. |
| 2011/0025267 A1 | 2/2011 | Kamen et al. |
| 2011/0031814 A1 | 2/2011 | Giesler |
| 2011/0037600 A1 | 2/2011 | Takehara et al. |
| 2011/0138377 A1 | 6/2011 | Allen |
| 2011/0153098 A1 | 6/2011 | Tomoita et al. |
| 2012/0022711 A1 * | 1/2012 | Sakaguchi et al. ............ 700/295 |
| 2012/0073885 A1 | 3/2012 | Glynn |
| 2012/0085387 A1 | 4/2012 | French, Sr. |
| 2012/0102332 A1 | 4/2012 | Mullin |
| 2012/0144828 A1 * | 6/2012 | Lazaris ........................ 60/641.1 |
| 2012/0158205 A1 * | 6/2012 | Hinman et al. ............... 700/297 |
| 2012/0271576 A1 * | 10/2012 | Kamel et al. .................... 702/62 |
| 2013/0213038 A1 * | 8/2013 | Lazaris ........................ 60/641.8 |

OTHER PUBLICATIONS

Chaudhry, H. and Bohn, T., "A V2G Application using DC Fast Charging and its Impact on the Grid", 2012 IEEE Transportation Electrification Conference and Expo (ITEC) [Online] 2012, pp. 1-6.

* cited by examiner

SYSTEM FOR TRACKING AND ALLOCATING RENEWABLE ENERGY CONTRIBUTIONS TO A MODULAR RENEWABLE ENERGY SYSTEM

CROSS-REFERENCE TO RELATED APPLICATION

This application claims the benefit of U.S. Provisional Application No. 61/530,565, filed Sep. 2, 2011, the entire contents of which are incorporated herein by reference.

BACKGROUND

The present invention relates to the generation of renewable energy, and more specifically to modular solar arrays and a system and method for tracking and allocating contributions to the system.

The increasing cost of diesel fuel, new regulations prohibiting idling and the use of diesel generators to power electrical systems while vehicles are at rest, and the increasing value of renewable energy credits is now reaching a point in the market where it is cost effective for transportation companies to invest in solar energy systems for their fleets. The trucks that transport goods around the country use tremendous amounts of diesel fuel, not just to fuel the engine, but also to drive the electrical systems of the trucks. While in motion, additional horsepower is required to drive the electrical systems to maintain cab heating and air conditioning, lights, radios, GPS tracking systems and cooling systems for cargo, thus requiring the engine to work harder and burn more fuel. While stationary at a truck stop, the engines and/or onboard generators are often left running for extended periods of time to continue to keep these electrical systems operating, burning additional fuel and contributing to poor air quality issues. The costs associated with running and maintaining auxiliary diesel generators are increasingly prohibitive and many companies are now at a crossroad where savings in fuel costs is critical not only to profitability, but to financial viability.

Solar energy is also at a crossroad where the solar panel systems are efficient enough and energy incentives are valuable enough to offset their initial costs over a reasonable period of time. Tied together with potential fuel savings in transportation systems, the combination may now be financially attractive to deserve large-scale deployment in the transportation industry.

SUMMARY

There is believed to be a need in the industry for modular, mobile renewable energy systems that take advantage of the space available on the roofs of trailers and other fleet vehicles to generate renewable energy to reduce fuel costs, and in addition, a further need to be able to link the individual mobile arrays together into larger arrays to even further offset the costs of deployment.

The system includes a solar panel array mounted to the roof of the trailer that will generate a portion of the electricity required by the truck while in motion thus reducing the load on the alternator and reducing fuel costs. The same solar array will generate an even greater portion of the electricity required by the truck while stationary at a truck stop or at any facility beginning with the truck's point of origin to its destination. The system further includes a battery storage system located in the truck that will be used to store electricity and then drive the electrical systems when the truck is stationary and adequate sunlight is not available, allowing the operator to turn off the engine entirely.

This type of system by itself is now a viable investment to reduce fuel costs. However, the more important aspect of the invention is a modular subscriber system that permits a plurality of these solar equipped trailers to be plugged into a local host to create a modular array that will provide power to a local facility and potentially feed power into the electrical grid. A further aspect of the invention is a network that links all of the hosts together into a system that can track individual contributions of each trailer or vehicle and allocate a credit to the owner to further generate income for the owner as an additional incentive to invest in the mobile PV array systems.

Accordingly, among the objects of the instant invention is the provision of a photovoltaic (PV) array that can be installed onto a fleet vehicle such as a trailer, bus etc. to reduce fuel costs.

Another object is the provision of a mobile PV array system that can be linked to a subscriber system to track Renewable Energy Credits (RECs) generated within a particular state.

Still another object of the invention is to provide a host control system into which a plurality of fleet vehicles can connect to collectively generate electricity.

Yet another object of the invention to provide a subscriber system which collectively tracks energy generation and REC's.

Other objects, features and advantages of the invention shall become apparent as the description thereof proceeds when considered in connection with the accompanying illustrative drawings.

BRIEF DESCRIPTION OF THE DRAWING FIGURES

In the drawings which illustrate the best mode presently contemplated for carrying out the present invention:

DETAILED DESCRIPTION OF THE PREFERRED EMBODIMENT

Figure 5:
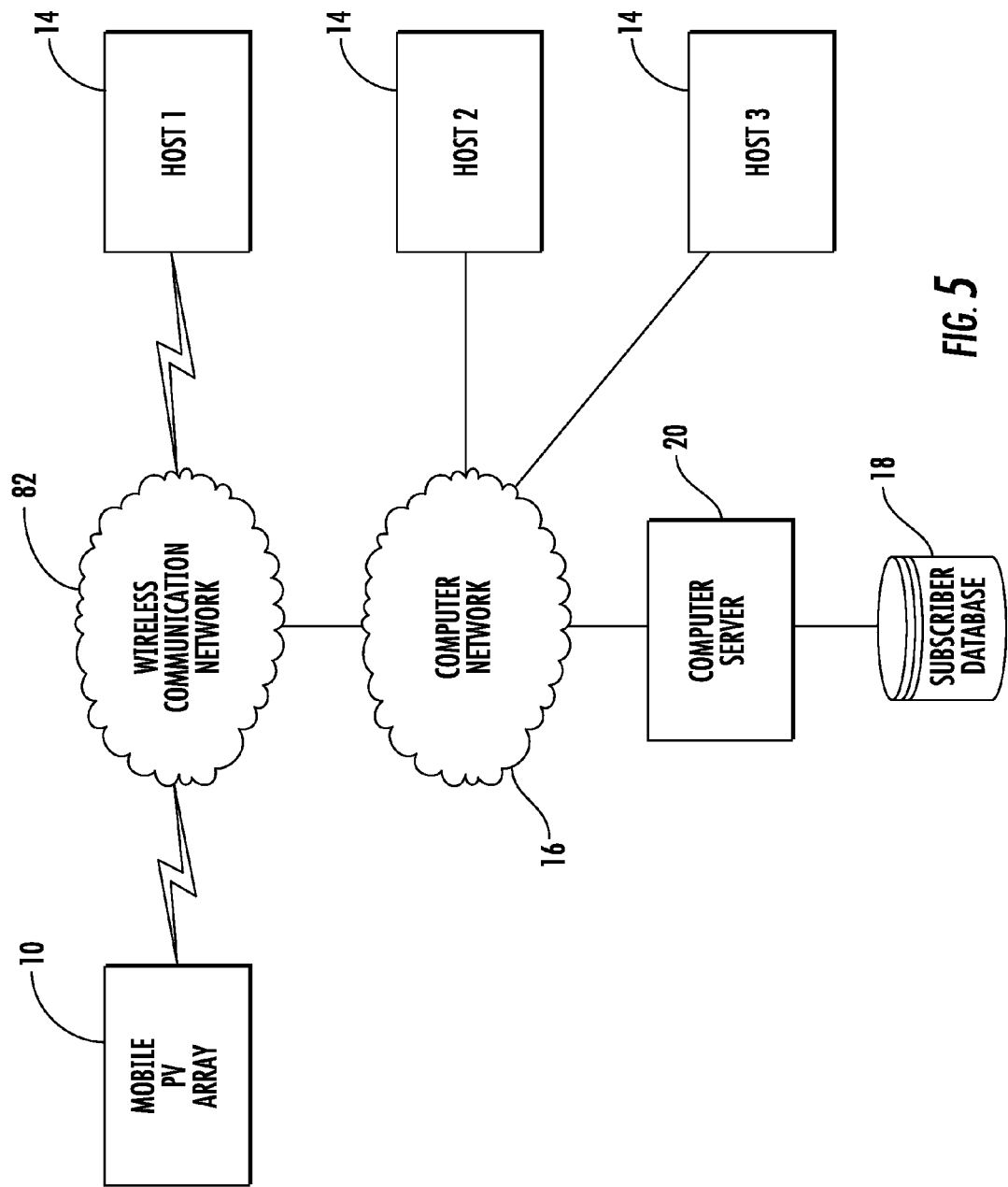
FIG. 5 is a schematic block diagram over the overall configuration of the modular array system.

Generally, the present invention provides a modular renewable energy tracking and allocation system including a plurality of renewable energy generating devices 10 (photovoltaic arrays) each having a device control system 12 and a respective device identification code, and a plurality of host renewable energy systems 14 (host facilities) each having a respective host identification code. The host systems 14 are each connected to a computer network 16 either by a wired connection or wirelessly through a cellular network or broadband WIFI (see FIG. 5).

The system further includes a network accessible subscriber database 18 for storing a plurality of database records containing subscriber data corresponding to the plurality of renewable energy generating devices 10 and the plurality of host renewable energy systems 14, and a computer server 20 in communication and the computer network. A software application running on the computer server 20 is operative communicating with the various host systems 14 and for writing data to and reading data from the subscriber database 18. The software application is also operative for managing owner/subscriber accounts and allocating energy credits to the owners based on individual energy contributions.

Each of the host facility systems 14 includes a plurality of connection ports 22 for receiving energy generated by the plurality of renewable energy generating devices 10, a central processing unit 24 in communication with the computer network 16 and the device control system 12, and a software application operating on the central processing unit 24 operative for measuring energy received from each of the plurality of renewable energy generating devices 10, generating energy data corresponding to the measured energy received from each of the plurality of renewable energy generating devices 10, associating the energy data with the respective device identification code, and sending the energy data with the associated device identification code and host identification code to the computer server 20 for storage on the subscriber database 18.

Figure 1:
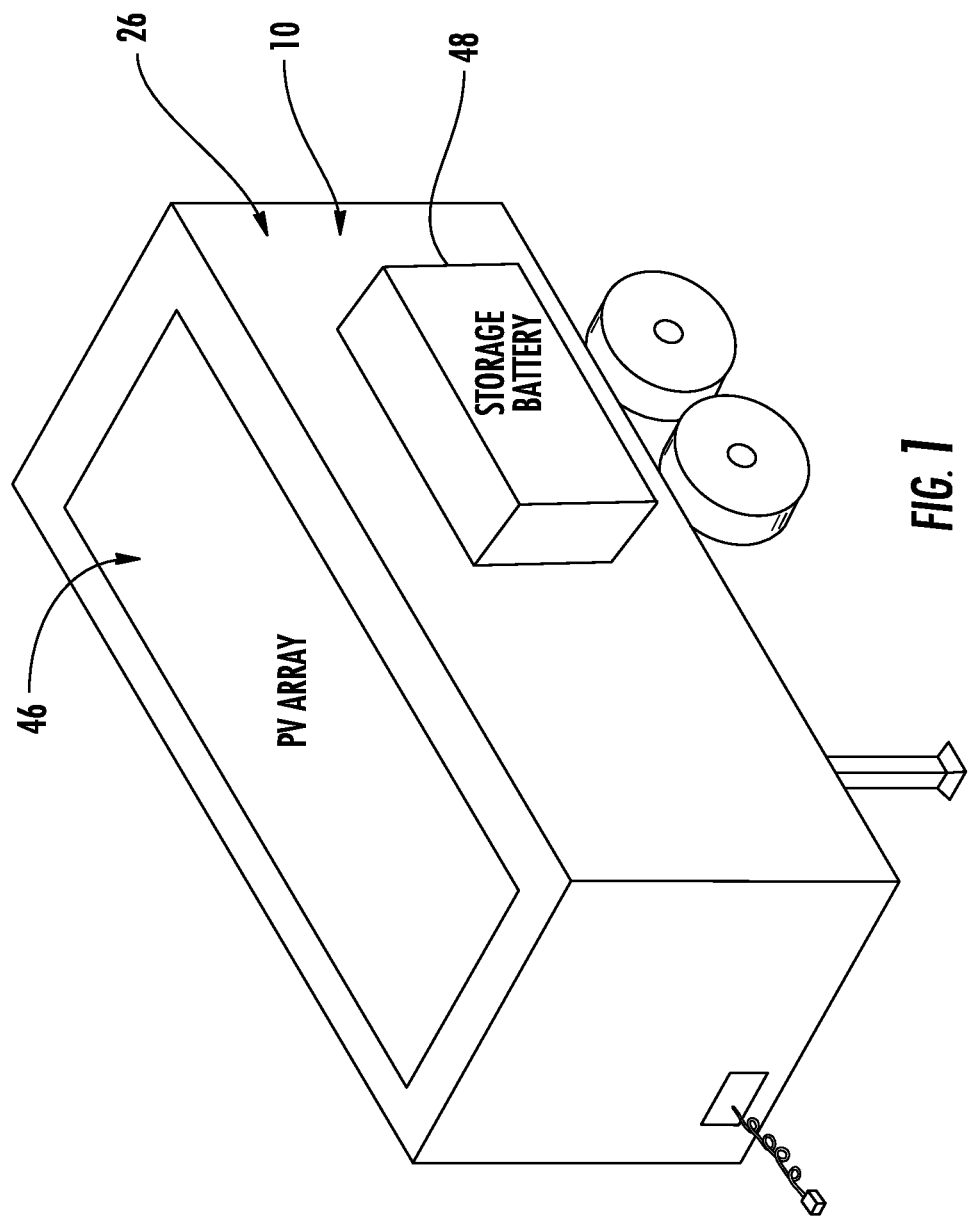
FIG. 1 is an illustration of a trailer including a PV array installed on its roof in accordance with the teachings of the present invention.

Referring to FIG. 1, there is shown a trailer 26. There are literally hundreds of thousands of such trailers in active use, or sitting in lots across the country. The invention provides renewable energy generating device 10, i.e. a solar photovoltaic system for installation onto the roof of the trailer 26. It should be understood that while the exemplary embodiment of the renewable energy system 10 as described herein is a photovoltaic array, the invention contemplates other renewable energy devices such as windmills, etc. which could eventually progress to a point where they could be used in a similar manner.

It should also be understood that while the exemplary embodiment herein is directed towards trailers, the system is equally applicable to containers, trains passenger buses, school buses, or other fleet vehicles having a significant roof space that can be utilized for a PV array. PV panels, PV arrays and PV electrical systems are well known and the specific details of the PV array and its operation will not be discussed in detail herein. FIG. 1 illustrates a simple arrangement showing a PV panel 10 installed onto the roof of the trailer 26. Multiple panel arrays are also contemplated.

Figure 2:
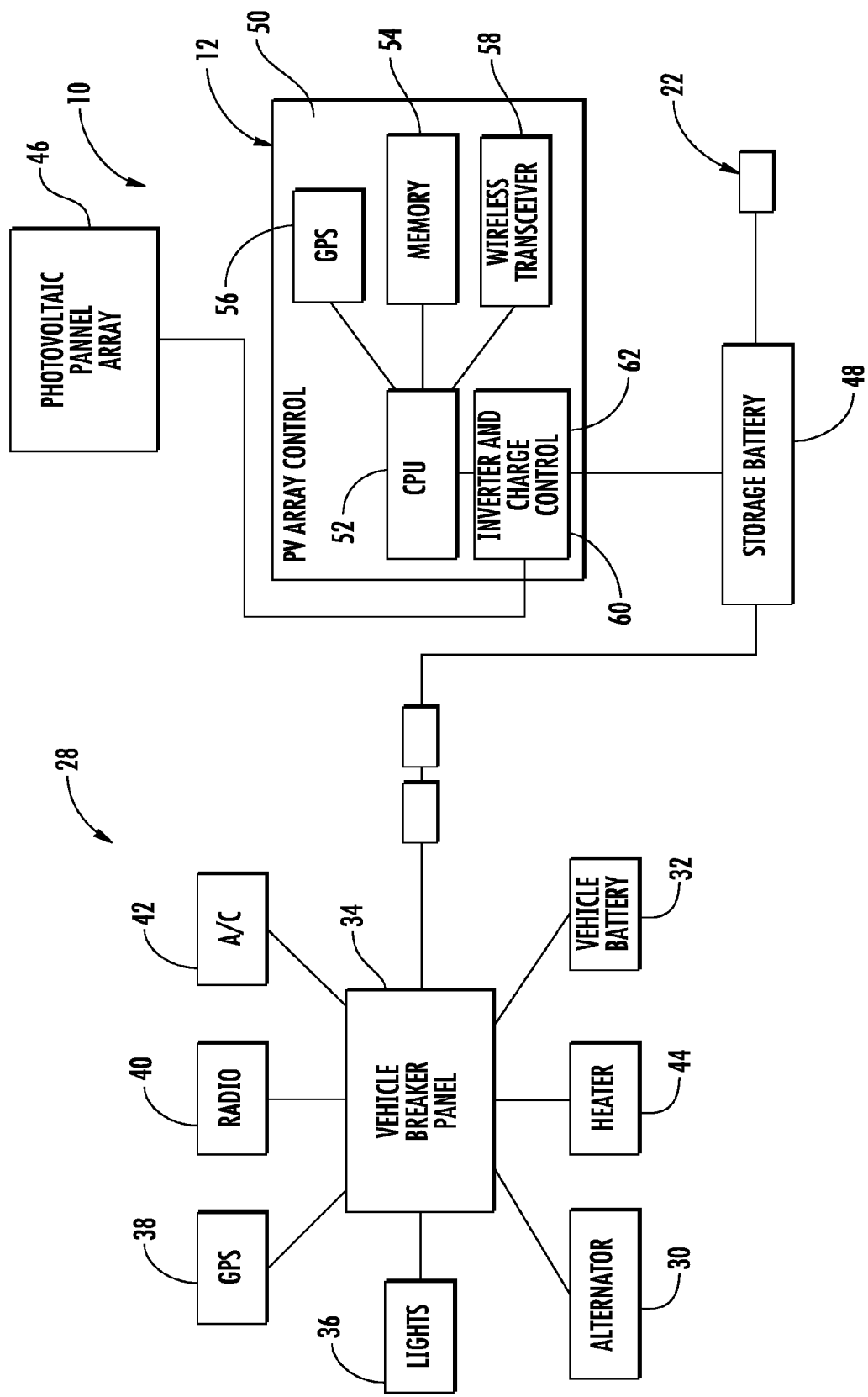
FIG. 2 is a schematic block diagram of the connections between the vehicle electrical system and the PV array system.

Turning now to FIG. 2, a block diagram of a tractor trailer electrical system 28 is shown in conjunction with the basic components of the PV array 10 mounted on the trailer 26. Generally, the vehicle electrical system 28 includes an alternator 30 to generate electricity, a battery 32, a breaker or fuse panel 34, and various electrical devices which draw a load from the system, i.e. lights 36, GPS 38, radio 40, air conditioning 42, heat 44, etc. The PV array system 10 includes the PV Array 46, a storage battery 48, and a PV array control system 50 including a CPU 52, a memory device 54, a GPS 56, a wireless transmitter 58, an inverter 60 and a charge controller 62. The PV array system 10 is connected directly into the vehicle electrical system 28 and delivers electrical power to the vehicle electrical system 28. Any electrical power generated reduces the load on the alternator 30 of the vehicle and ultimately saves fuel. Excess electricity can be stored in the battery 48 for use when the vehicle is idle.

Before proceeding with a further description of the subscription system of the invention, it will be helpful to understand several aspects of renewable energy distribution and the ways in which the solar energy generators can benefit from investment in solar infrastructure.

The first concept that should be understood is Net Metering. Solar-based systems are intermittent generators which only produce electricity when the sun is shining. When the sun is not shining, the generator does not produce power and may even use electricity for power electronics. Customer loads vary over time (e.g. lights, HVAC, plug loads, etc).

Customers who have a photovoltaic system will draw power from the electric grid when their generation does not meet the energy needs of the facility loads. These same customers may send power to the grid at times when their electric generation exceeds the energy needs of the facility. Net metering allows the customer to net out the energy drawn from the grid with energy sent to the grid over a billing period (billing month). For most small customers (residential and small business), the electric utility simply reads the retail meter at the beginning and end of the billing month to determine the net use or export.

At the end of a billing month, if a customer has used more energy than they have sent out to the grid (i.e. their meter reading went up during the billing month), they will only have to pay energy related charges for the net energy used during the billing month. They used all the energy produced by their generator during the billing month, and this reduced the energy they had to purchase from the utility. If the customer has sent more energy to the grid than was drawn from the grid during the billing month (i.e. their meter reading went down during the billing month), then the customer is a net exporter during that billing period. When a customer is a net exporter during a billing period, they are billed for zero kilo-watt hour usage and a renewable generation credit will be applied to the account. In markets that allow for Virtual Net Metering, the customer can sell energy generated to a third party under a Power Purchase Agreement (PPA).

The next concept that should be understood is Renewable Energy Credits. Renewable Energy Certificates (RECs), also known as Green tags, Renewable Energy Credits, Renewable Electricity Certificates, or Tradable Renewable Certificates (TRCs), are tradable, non-tangible energy commodities in the United States that represent proof that 1 megawatt-hour (MWh) of electricity was generated from an eligible renewable energy resource (renewable electricity). Solar Renewable Energy Certificates (SRECs) are RECs that are specifically generated by solar energy.

These certificates can be sold and traded or bartered, and the owner of the REC can claim to have purchased renewable energy. RECs represent the environmental attributes of the power produced from renewable energy projects and are sold separate from commodity electricity. It is important to understand that the energy associated with a REC is sold separately and is used by another party. The consumer of a REC receives only a certificate.

In states that have a REC program, a green energy provider (such as a solar power generator) is credited with one REC for every 1,000 kWh or 1 MWh of electricity it produces (for reference, an average residential customer consumes about 800 kWh in a month). A certifying agency gives each REC a unique identification number to make sure they can be tracked effectively. The green energy is then fed into the electrical grid (by mandate), and the accompanying REC can then be sold on the open market.

There are two main markets for RECs in the United States: compliance markets and voluntary markets. Compliance markets are created by government policies that exist in at least 29 states, called Renewable Portfolio Standards (RPS). In these states, the electric companies are required to supply a certain percent of their electricity from renewable generators by a specified year. For example, in California the law is 33% renewable by 2020, whereas New York has a 24% requirement by 2013. Electric utilities in these states demonstrate compliance with their requirements by purchasing RECs.

Voluntary markets are ones in which customers choose to buy renewable power out of a desire to use renewable energy. Most corporate and household purchases of renewable energy are voluntary purchases. Renewable energy generators located in states that do not have a Renewable Portfolio Standard can sell their RECs to voluntary buyers, usually at a cheaper price than compliance market RECs.

The object of the invention is to create a network and subscription system where a plurality of host facilities 14 install and operate modular power systems that will allow a plurality of solar equipped vehicles or trailers 10 to be connected to the system to collectively increase the generating capacity of the host system. Each mobile array 10 is identified by a unique identification code. Each facility 14 is also identified by a unique identification code. The owners of the trailers and hosts establish accounts on the subscription system and link each of their properties to their account. This subscriber data is stored in the subscriber database 18 (See FIG. 5).

Figure 3:
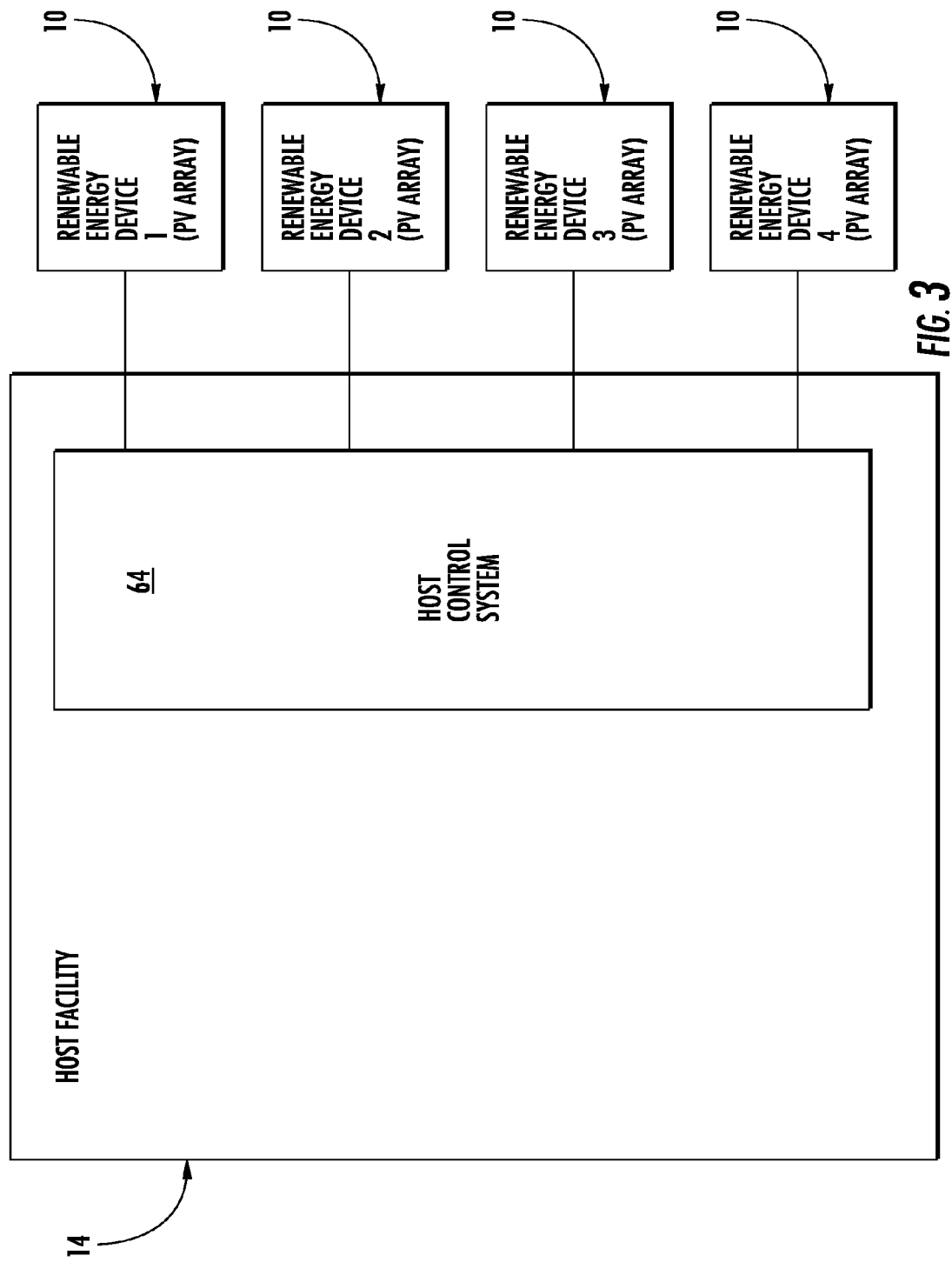
FIG. 3 is a schematic block diagram of the modular array system of a single host.
Figure 4:
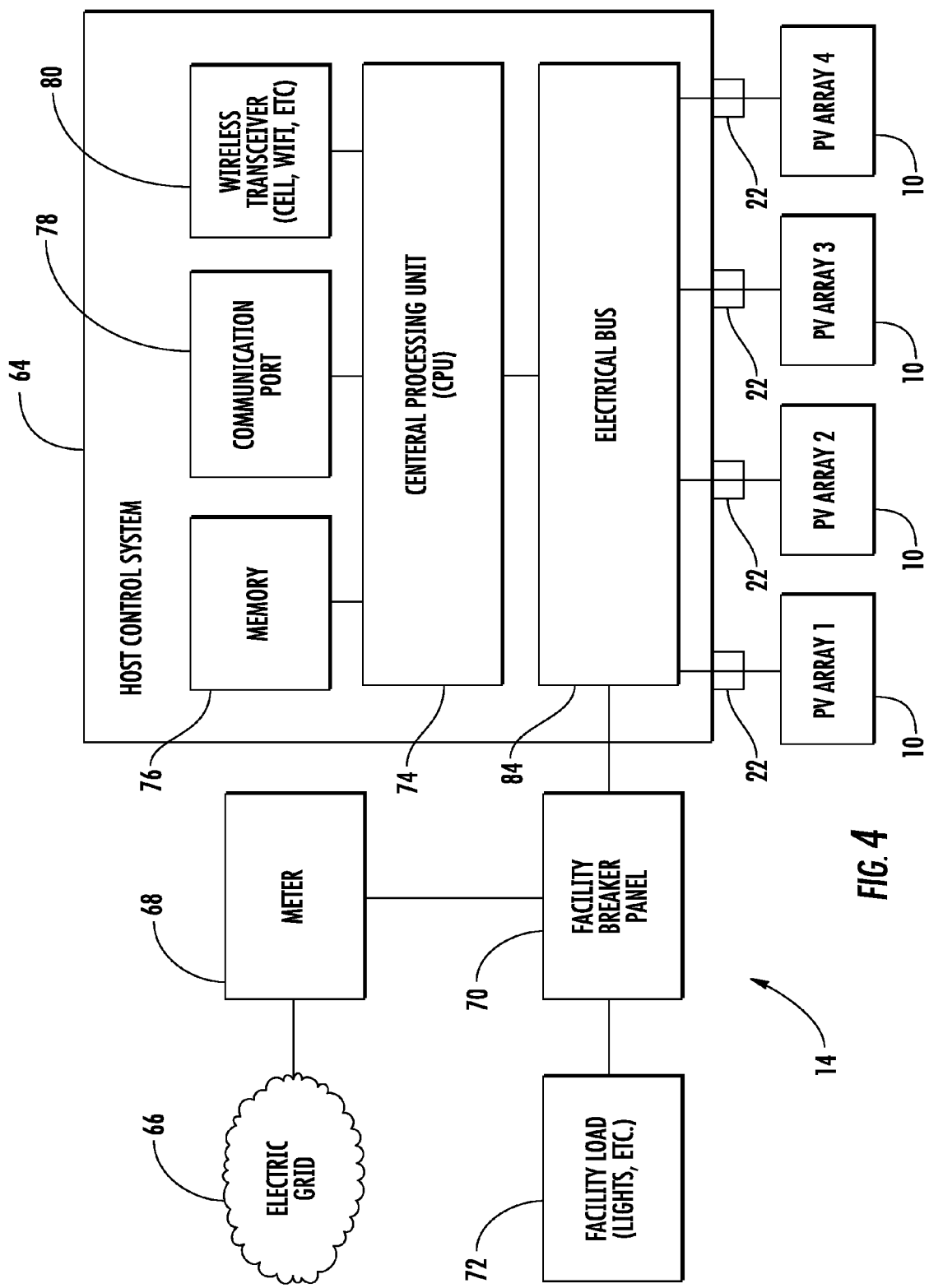
FIG. 4 is a more detailed block diagram thereof.

Turning to FIG. 3, a basic block diagram of the local modular host system is illustrated. The facility or host 14 installs and operates a solar power system having a host renewable energy control system 64 and a plurality of connection ports 22 for connecting to multiple solar equipped trailers 10 (renewable energy generating devices 1-4). FIG. 4 is a more detailed block diagram. On the left side of FIG. 4, the host is connected to the electrical grid 66 through a meter 68 and a breaker panel 70. The breaker panel 68 feeds multiple devices, which draw a load 72 from the system. On the right side, the renewable energy host system includes the host control system 64 and in accordance with the invention, and a plurality of solar equipped trailers 10 (renewable energy generating device) are connected to the system 64 through the electrical connector ports 22. The host control system 64 includes a CPU 74, memory 76, a communication port 78 for connection to the computer network 16, a wireless transceiver 80 (cellular or broadband WIFI) for wireless communication with a wireless communication network 82 and the computer network 16 (See FIG. 5), and an electrical bus 84 to deliver the solar power into the facility breaker panel 70. The individual device ID's are communicated to the host control system 64 by either a wired connection or wirelessly.

In a Net Metering scheme, the host facility 14 gets the benefit of the electricity generated from the solar power system 64 by reducing the amount of power it draws from the grid 66. This translates into direct monetary savings for the host 14. However, the object of the subscription system is to provide incentive to the owners of the vehicles or trailers to install the mobile solar arrays 10 onto the vehicles and then connect those mobile arrays 10 to a host 14 when stationary. Accordingly, the host system software is configured to monitor and track the individual contribution of each mobile array 10, calculate a credit for the contribution and submit the credit to the subscriber system. The credit is then deposited into the owner's account. To incentivize the host 14, the host pays less for energy supplied through the system than it would otherwise pay the utility for the energy, or less than the value it receives from the Net Metering credit. In this manner, both the host and the mobile array owner benefit.

Additionally, the host 14 can apply to receive status as a renewable energy generator and receive Renewable Energy Credits (RECs). As described hereinabove, REC's are extremely valuable in states with RPS policies and provide additional incentive for both the host and the mobile array owners to participate in the system. If a host is an authorized REC generator, it can receive RECs for the power generated from the modular mobile array it operates and can then sell those RECs. If the host is a REC generator, it can then provide an increased credit to the individual array owners combining both the credit for the electricity generated as well as a credit attributed to future sale of a REC that the array owner contributed to creating.

Finally, it is also contemplated that individual mobile array owners can be credited for solar energy generated by the devices 10 while in motion. The mobile PV array control software can monitor energy generated by the PV array 10 while travelling. As indicated above, certain states have very valuable incentive systems for generating green energy. The mobile PV system 10 can periodically upload data (wireless cellular or broadband WIFI) (see FIG. 5) identifying energy created including location as determined by the device GPS 56, time stamps and ID codes to credit the owner's account with energy created while in motion. For example, a solar equipped tractor trailer on the NJ turnpike will generate a specific amount of energy and the owner can receive a credit through the subscriber system. That credit can be combined with credits generated by other mobile solar arrays to generate a REC that could later be sold for value.

Accordingly, it can be seen that the present invention provides a modular PV array and credit allocation system that will incentivize fleet owners to invest in solar infrastructure. The system provides a unique and novel, photovoltaic array system which is installed onto a fleet vehicle such as a trailer, bus etc. to reduce fuel costs, a mobile PV array system that can be linked to a subscriber system to track Renewable Energy Credits (RECs), a host control system into which a plurality of fleet vehicles can connect to collectively generate electricity, and a subscriber system which collectively tracks energy generation and REC's.

For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. A modular renewable energy tracking and allocation system comprising:
   a plurality of photovoltaic arrays each installed or mounted on one of a plurality of vehicles having a device control system and a respective photovoltaic array identification code;
   a plurality of host renewable energy systems each having a respective host identification code;
   a computer network;
   a network accessible database storing a plurality of database records containing data corresponding to said plurality of photovoltaic arrays and said plurality of host renewable energy systems;
   a computer server in communication with said computer network, and a software application running on said computer server for writing data to and reading data from said network accessible database; and
   each of said host renewable energy systems including, a plurality of connection ports for receiving energy generated by said plurality of photovoltaic arrays,
a central processing unit in communication with said computer network and said device control system, and
a software application operating on said central processing unit operative for
measuring energy received from each of said plurality of photovoltaic arrays,
generating energy data corresponding to said measured energy received from each of said plurality of photovoltaic arrays,
associating said energy data with said respective photovoltaic array identification code, and
sending said energy data with said associated photovoltaic array identification code and said host identification code to said computer server for storage on said network accessible database.

2. The modular renewable energy tracking and allocation system of claim 1 wherein software application running on said computer server is further operative for allocating renewable energy credits to owners of said host renewable energy systems and/or said photovoltaic arrays.

3. The modular renewable energy tracking and allocation system of claim 1 wherein said central processing unit of at least one of said plurality of host renewable energy systems is in wired communication with said computer network.

4. The modular renewable energy tracking and allocation system of claim 1 further comprising:
a wireless communication system, said computer network being in communication with said wireless communication system, and
at least one of said plurality of host renewable energy systems including a wireless transceiver for wirelessly communicating with said wireless communication system.

5. The modular renewable energy tracking and allocation system of claim 1 wherein said device control system of at least one of said photovoltaic arrays is in wired communication with said central processing unit of at least one of said host renewable energy systems.

6. The modular renewable energy tracking and allocation system of claim 1 further comprising:
a wireless communication system, said computer network being in communication with said wireless communication system,
at least one of said plurality of photovoltaic arrays including a wireless transceiver for wirelessly communicating with said wireless communication system,
said device control system having a software application operating to generate energy data corresponding to energy generated while said photovoltaic array is not connected to a host renewable energy system, and
said device control system sending said energy data with said associated device identification code to said computer server for storage on said network accessible database.

7. The modular renewable energy tracking and allocation system of claim 6 wherein said at least one of said plurality of photovoltaic arrays includes a GPS device, said energy data including location data corresponding to where said energy was generated.

8. The modular renewable energy tracking and allocation system of claim 1 wherein said host renewable energy system includes an electrical bus and inverter which is connected to a host breaker panel to provide electrical energy to the host electrical system.

9. The modular renewable energy tracking and allocation system of claim 1 wherein said host renewable energy system further comprises:
a memory device, and
said software application running on said central processing unit of said host renewable energy system temporarily storing said energy data and said photovoltaic array identification code in said memory device prior to sending.

10. A renewable energy tracking and allocation system comprising:
a photovoltaic array installed or mounted on a vehicle having a device control system and a respective photovoltaic array identification code;
a host renewable energy system having a respective host identification code;
a computer network;
a network accessible database storing at least one database record containing data corresponding to said photovoltaic array and said host renewable energy system;
a computer server in communication with said computer network, and a software application running on said computer server for writing data to and reading data from said network accessible database; and
said host renewable energy system including,
at least one connection port for receiving energy generated by said photovoltaic array,
a central processing unit in communication with said computer network and said device control system, and
a software application operating on said central processing unit operative for
measuring energy received from said photovoltaic array,
generating energy data corresponding to said measured energy received from said photovoltaic array,
associating said energy data with said respective photovoltaic array identification code, and
sending said energy data with said associated photovoltaic array identification code and said host identification code to said computer server for storage on said network accessible database.

11. The renewable energy tracking and allocation system of claim 10 wherein software application running on said computer server is further operative for allocating a renewable energy credit to an owner of said host renewable energy system and/or said photovoltaic array.

12. The renewable energy tracking and allocation system of claim 10 wherein said central processing unit of said host renewable energy systems is in wired communication with said computer network.

13. The renewable energy tracking and allocation system of claim 10 further comprising:
a wireless communication system, said computer network being in communication with said wireless communication system, and
said host renewable energy systems including a wireless transceiver for wirelessly communicating with said wireless communication system.

14. The renewable energy tracking and allocation system of claim 1 wherein said device control system is in wired communication with said central processing unit of said host renewable energy system.

15. The renewable energy tracking and allocation system of claim 1 further comprising:

a wireless communication system, said computer network being in communication with said wireless communication system, said photovoltaic array including a wireless transceiver for wirelessly communicating with said wireless communication system, said device control system having a software application operating to generate energy data corresponding to energy generated while said photovoltaic array is not connected to said a respective host renewable energy system, and said device control system sending said energy data with said associated device identification code to said computer server for storage on said network accessible database.

16. The renewable energy tracking and allocation system of claim 15 wherein said photovoltaic array includes a GPS device, said energy data including location data corresponding to where said energy was generated.

17. The renewable energy tracking and allocation system of claim 1 wherein said host renewable energy system includes an electrical bus and inverter which is connected to a host breaker panel to provide electrical energy to a host electrical system.

18. The renewable energy tracking and allocation system of claim 1 wherein said host renewable energy system further comprises:

a memory device, and said software application running on said central processing unit of said host renewable energy system temporarily storing said energy data and said photovoltaic array identification code in said memory device prior to sending.

* * * * *